United States Patent
Ko

(10) Patent No.: US 10,382,205 B1
(45) Date of Patent: Aug. 13, 2019

(54) SECURITY SYSTEM AND METHOD FOR USING A BLOCKCHAIN SERVICE THROUGH PRIVACY-AWARE BLOCKCHAIN ARBITRATION SERVER

(71) Applicant: Hajoon Ko, Cambridge, MA (US)

(72) Inventor: Hajoon Ko, Cambridge, MA (US)

(*) Notice: Subject to any disclaimer, the term of this patent is extended or adjusted under 35 U.S.C. 154(b) by 0 days.

(21) Appl. No.: 16/276,882

(22) Filed: Feb. 15, 2019

(30) Foreign Application Priority Data

Jun. 10, 2018 (KR) .................. 10-2018-0066530

(51) Int. Cl.
*H04L 9/32* (2006.01)
*H04L 9/06* (2006.01)
*H04L 29/06* (2006.01)

(52) U.S. Cl.
CPC .......... *H04L 9/3236* (2013.01); *H04L 9/0637* (2013.01); *H04L 63/20* (2013.01); *H04L 2209/38* (2013.01)

(58) Field of Classification Search
CPC .................................................. H04L 9/3236
See application file for complete search history.

(56) References Cited

U.S. PATENT DOCUMENTS

| | | | |
|---|---|---|---|
| 9,569,771 B2 | 6/2016 | Lesavich | |
| 10,289,456 B2* | 5/2019 | Erickson | G06F 9/52 |
| 2017/0046693 A1* | 2/2017 | Haldenby | G06Q 20/0655 |
| 2017/0193464 A1 | 7/2017 | Sher | |
| 2018/0131706 A1 | 5/2018 | Anderson | |
| 2018/0309567 A1* | 10/2018 | Wooden | H04L 9/06 |

OTHER PUBLICATIONS

Zou et al., "A Dispute Arbitration Protocol Based on a Per-to-Peer Service Contract Management Scheme", 2016, IEEE Intervaltion Conference on Web Services, pp. 41-48 (Year: 2016).*

* cited by examiner

*Primary Examiner* — William S Powers
(74) *Attorney, Agent, or Firm* — Vincent G. LoTempio; Kloss, Stenger & LoTempio; David T. Stephenson

(57) ABSTRACT

A security method for using a blockchain service creates a secure blockchain to protect data through a privacy-aware blockchain arbitration server that has zero or restricted capability to view or modify the contents of each block being submitted to the blockchain, creating a barrier between arbitration server and blockchain. A block creator constraint and a block approval authority regulate which block submitter, or creator, and what type of block can be submitted and accepted by blockchain. Arbitration server sums the number of approvals for new blocks added to blockchain. In summing, if the accumulated approvals and disapprovals of blocks satisfy the block's approval policy, the arbitration server adds the block to blockchain and sends to blockchain participants upon queries. If the accumulated approvals and disapprovals of blocks don't satisfy block's approval policy, the arbitration server drops the block. Blockchain participants verify if the new blocks added by the arbitration server.

20 Claims, 5 Drawing Sheets

Blockchain Configuration

Administrator (admin, Block Creator): Data market server
Approver: IoT A, IoT B, IoT C, Data market server
Viewer: Tom, Jane, Ella, Kelly
Role modification creator constraint: Data market server
Role modification approval constraint: IoT A or Data market server
Block type definition:

- "contract document": Block creator constraint = none
  Block approval constraint = all(approvers)
  Executable code = none

- "data sales": Block creator constraint = none
  Block approval constraint = Data market server and input.argument1
  Execution Code = C, function (enity seller, int data) {...}

- "payment": Block creator constraint = none
  Block approval constraint = Data market server and input.argument1
  Execution Code = Java, function (entity beneficiary, int payment) {...}

{Encryption target}: "contract document" = {data, approvals/disapprovals of approvers}
"data sales" = {input.argument2}
"payment" = {executable code, input value.argument2}

Block type definition modification creator constraint: admin
Block type definition modification approval constraint: Data market server and AtLeast(1/2 of all approvers)

252 — 223

"contract document"
Block creator: IoT A
Data: Data market contract document.pdf
Block approvers list: IoT A, IoT B, IoT C, Data market server

"data sales" — 224
Block creator: IoT A
Executable code input value: seller=IoT A, data=Data A1
Block approvers list: IoT A, Data market server

"data sales" — 225
Block creator: IoT B
Executable code input value: beneficiary=IoT B, data=Data B1
Block approvers list: IoT B, Data market server

"payment" — 226
Block creator: Data market server
Executable code input value: beneficiary=IoT C, payment=100,000
Block approvers list: IoT C, Data market server

253

Blockchain Reconfiguration
Block creator: Data market server
Block type definition modification:
  "contract document": Block approval constraint = all(approvers) or (Data market server and Oliver)
Block approvers list: IoT A, IoT C, Data market server

FIG 5

SECURITY SYSTEM AND METHOD FOR USING A BLOCKCHAIN SERVICE THROUGH PRIVACY-AWARE BLOCKCHAIN ARBITRATION SERVER

CROSS-REFERENCED APPLICATIONS

This Application claims the benefit from the priority of the Republic of Korea patent application number 10-2018-0066530, which was filed on Jun. 10, 2018.

FIELD OF THE INVENTION

The present invention relates generally to a security system and method for using a blockchain service through a privacy-aware blockchain arbitration server. More so, the present invention relates to a system and method that creates a secure blockchain to protect data on a blockchain service through a privacy-aware blockchain arbitration server; whereby the method allows for setting authorization policies for each type of data or executable code stored in each block of the blockchain, so as to create privacy; and whereby data is not leaked to unauthorized blockchain participants, i.e. administrator, blockchain server, client.

BACKGROUND OF THE INVENTION

The following background information may present examples of specific aspects of the prior art (e.g., without limitation, approaches, facts, or common wisdom) that, while expected to be helpful to further educate the viewer as to additional aspects of the prior art, is not to be construed as limiting the present invention, or any embodiments thereof, to anything stated or implied therein or inferred thereupon.

Typically, a blockchain is a distributed database that keeps a continuously growing list of data records. Each data record is protected against tampering and revisions. Blockchains are used with public ledgers of transactions, where the record is enforced cryptographically. This invention enables transactions to be private by encrypting the contents of the transaction and only users or entities that have the key to the transaction can view the transaction.

Generally, blockchain technology was developed as a way of providing a publicly transparent and decentralized ledger that is configured to track and store digital transactions in a publicly verifiable, secure, and hardened manner to prevent tampering or revision.

A typical blockchain includes three primary functions: read, write, and validate. For example, a user of the blockchain must have the ability to read the data that resides on the blockchain. A user of the blockchain must also have the ability to write, e.g. append, data to the blockchain. Every write operation starts out as a proposed transaction that is posted on the network. The transaction may be submitted for addition to the blockchain by a user of the blockchain, for example, a wallet application or other application program interface (API). Once submitted, the proposed transaction is added to a pool of available transactions for addition to the blockchain. Validator nodes associated with the blockchain may then select transactions from the pool for addition to a new block.

Data stored on a blockchain can only be safely removed through a fork of the original. While there are proposed solutions, any personal information that was stored on the "old chain" would continue to exist until that blockchain was not supported. The blockchain's immutable nature makes editing, removing, accessing or modifying personal data stored on a blockchain very difficult, if not impossible. More importantly, the inability to remove personal data puts blockchain technology at odds with many privacy laws and principles.

A block generally contains four pieces of information: the non-invertible 'hash' of the previous block, a summary of the included transaction, a time stamp, and the Proof of Work that went into creating the secure block. Once information is entered on the blockchain, it is extremely difficult to alter: a blockchain network lacks a centralized point of vulnerability for hackers to exploit and each block includes the previous block's non-invertible 'hash' so any attempts to alter any transaction with the blockchain are easily detectable.

Other proposals have involved blockchain security systems and methods. The problem with these security methods is that they do not separate the server from the blockchain; thereby creating security breach issues. Even though the above cited blockchain security systems and methods meet some of the needs of the market, a system and method that creates a secure blockchain to protect data on a blockchain service through a privacy-aware blockchain arbitration server; whereby the method allows for setting authorization policies for each type of data or executable code stored in each block of the blockchain, so as to create privacy; and whereby data is not leaked to unauthorized blockchain participants, i.e. administrator, blockchain server, client, is still desired.

SUMMARY

Illustrative embodiments of the disclosure are generally directed to a security system and method for using a blockchain service through a privacy-aware blockchain arbitration server. The security system and method creates a secure blockchain to protect data on a blockchain service through a privacy-aware blockchain arbitration server that, by default, has no right to view or modify the contents of each block being submitted to the blockchain. Thus, a barrier forms between the arbitration server and the blockchain. A block creator constraint and a block approval authority regulate which block submitter, or the actual "creator" of the block, and what type of block can be submitted to and accepted by the blockchain. The arbitration server sums the number of approvals for new blocks added to the blockchain. In summing, if the accumulated approvals and disapprovals of blocks satisfy the block's approval policy, the arbitration server adds the block to the blockchain and sends it to blockchain participants upon queries. However, if the accumulated approvals and disapprovals of blocks don't satisfy the block's approval policy, the arbitration server drops the block. Blockchain participants can also verify if the new blocks added by the arbitration server satisfy the block creator constraint and block approval constraints for each typed block.

In some embodiments, a security method for using a blockchain service through a privacy-aware blockchain arbitration server may include an initial Step of submitting, by an administrator, a configuration block to a privacy-aware blockchain arbitration server. Another Step involves defining, within the blockchain configuration block, a typed block which contains at least one block creator constraint and one block approval policy.

The method may further comprise a Step of creating the typed block, by a blockchain participant, the blockchain participant including at least one of the following: the administrator, a block viewer, a blockchain approver, and a nonparticipant. Another Step includes sending the typed block to the blockchain arbitration server. Yet another Step may include determining, by the blockchain arbitration server based on the block creator constraint, which of a plurality of block submitters is approved to submit a block to the blockchain.

In other embodiments, the method comprises a Step of determining, by the blockchain approvers, to approve adding a submitted block to the blockchain. A Step may include summing, by the arbitration server, the number of approvals and disapprovals on each block. Another Step includes, whereby, if the accumulated approvals and disapprovals of blocks satisfy the block approval policy, adding, by the blockchain arbitration server, the block to the blockchain.

If satisfied, a Step comprises sending, upon receiving a query from the block submitters, the submitted blocks to the block submitters. Another Step involves, whereby if the accumulated approvals and disapprovals of blocks don't satisfy the block approval policy, deleting, by the blockchain arbitration server, the block. In some embodiments, a Step may include verifying, by the block submitters upon receiving blocks from the blockchain arbitration server, whether received blocks satisfy each of the block creator constraint and block approval policy.

A final Step comprises creating, by the blockchain participant, at least one role change creation, a role change creation regulating the roles of the administrator, the blockchain approver, the block creator, the block viewer, and the nonparticipant. However, the method may also include a Step of creating, by the blockchain approvers, at least one typed block definition policy, the typed block definition policy regulating the block submitters.

In another aspect, the bloc submitters have a read privilege on the blockchain.

In another aspect, the nonparticipant is restricted from the read privilege.

In another aspect, the blockchain participant includes: the administrator, a block viewer, a blockchain approver, and a nonparticipant.

In another aspect, the method further comprises a step of creating, by the blockchain participant, at least one role change creation, a role change creation regulating the roles of the administrator, the blockchain approver, the block creator, the block viewer, and the nonparticipant In another aspect, both the block creation submitter constraint and the block approval policy authorize addition of the block to the blockchain.

In another aspect, the arbitration server, by default, has no right to view or modify the contents of the block. This is because the blocks are cryptographically protected against the arbitration server.

In yet another aspect, the block approval policy comprises a Boolean expression.

One objective of the present invention is to provide data security and integrity for data stored on a blockchain against the blockchain arbitration server.

Another objective is to enable companies or organizations who don't have hardware infrastructure to deploy a full-blown decentralized blockchain management server nodes can conveniently use the blockchain arbitration server to maintain their own blockchain, whose security and integrity is guaranteed even in the case that the blockchain arbitration server is compromised.

Another objective is to protect personal identifications, medical records, and financial records, while enabling an access control to the data.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which:

FIG. 5 illustrates a dynamic executable code embodiment based on the blockchain service, in accordance with an embodiment of the present invention.

Like reference numerals refer to like parts throughout the various views of the drawings.

DETAILED DESCRIPTION OF THE INVENTION

Figure 1:
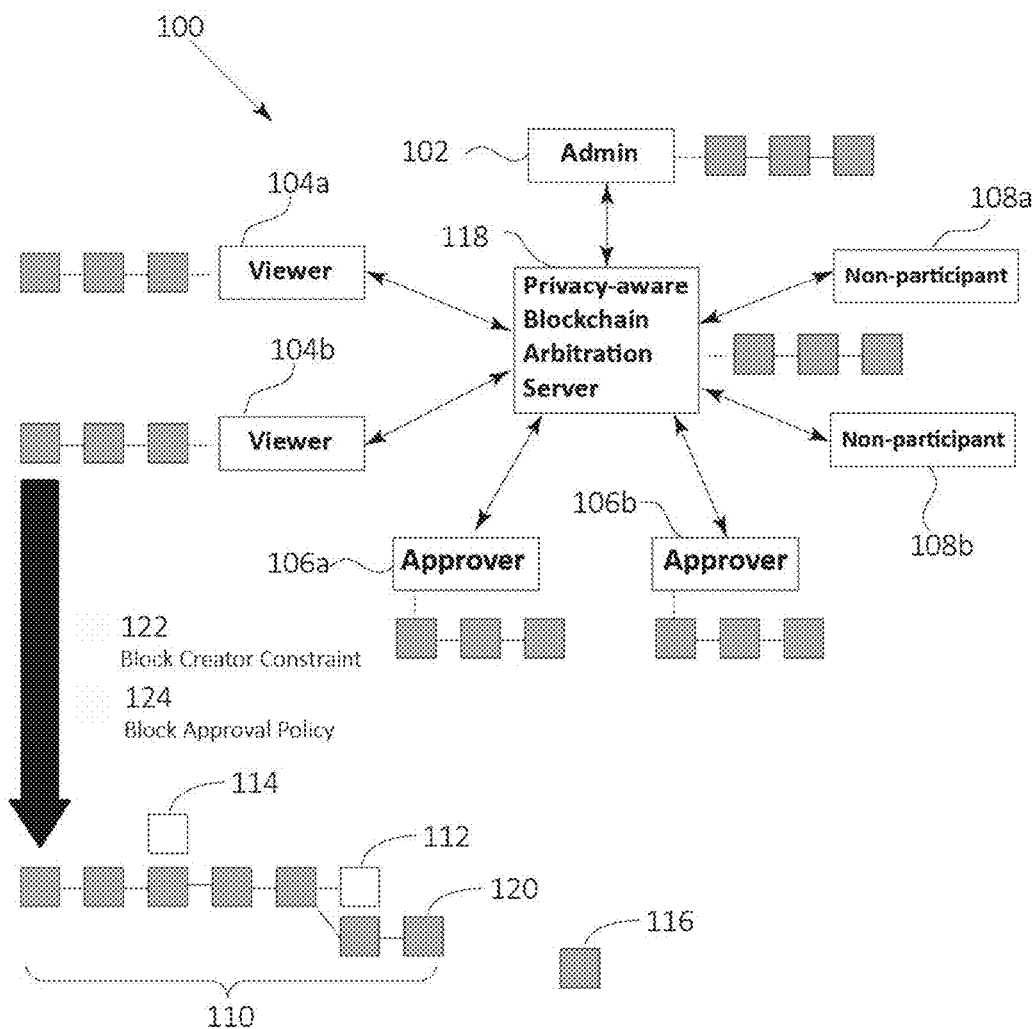
FIG. 1 illustrates a block diagram of an exemplary system for using a blockchain service through a privacy-aware blockchain arbitration server, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A security system 100 and method 300 for using a blockchain service through a privacy-aware blockchain arbitration server is referenced in FIGS. 1-5. Security system 100 provides a unique blockchain arbitration server 118 to protect the blockchain 110 from unapproved blocks, hacks, and viruses. Security system 100 provides a privacy-aware blockchain arbitration server 118 that is maintained separately from the blockchain 110. Arbitration server 118, by default, has no right to view or modify the contents of each block 114 that is submitted to the blockchain 110, as the blockchain's confidentiality and integrity is cryptographically protected against the arbitration server. This creates a barrier that protects the blockchain, and newly submitted blocks 114 therein. In this manner, data on the blockchain is protected from corruption.

FIG. 1 references a diagram of security system 100, illustrating client use of the blockchain service through privacy-aware blockchain arbitration server 118. As shown, security system 100 allows each client, or blockchain participant, of the blockchain to take a role of an administrator 102, zero or more viewer 104a, 104b, at least one blockchain approver 106a, 106b, and zero or more nonparticipant 108a, 108b.

The blockchain participant has the capacity to create, at least one role change creation, a role change creation regulating the roles of the administrator, the blockchain approver, the block creator, the block viewer, and the nonparticipant. There is no particular role called a block submitter, because any blockchain participants, who are either an administrator or approver or viewer, can become a block submitter. Note that a block submitter is identical to a block creator. Also, the document seems to use the word "viewer" instead of "reader", so let's make it consistent. It is significant to note that, technically, there is no role called a block submitter, because a block can be submitted by any participants among administrators, approvers, and viewers, as far as the block creation submitter constraint for the specified typed block is met.

In some embodiments, the authority of the clients differs according to each role. Viewer 104a-b is a client who can read and view the blockchain 110 with no permission to approve new blocks 114. Viewer 104a-b has a read privilege on the blockchain. A blockchain approver 106a-b is a client who is able to browse/read the blockchain 110 and also has the authority to approve the new blocks.

Further, an administrator 102 has all the rights of the blockchain approver 106a-b and has the authority to set, distribute and reconfiguration the cryptographic key necessary for the encryption of the blockchain 110. Nonparticipant 108a-b is an outsider who does not have access to the blockchain 110, and is restricted from read privilege. The present invention does not limit the number of administrators 102, blockchain approvers 106a, 106b, and viewer 104a, 104b in one blockchain 110.

Security system 100 also provides a privacy-aware blockchain arbitration server 118. Arbitration server 118, by default, has no right to view or modify the contents of the block. Arbitration server 118 allows for setting authorization policies to add blocks 114 to the blockchain 110 after receiving authorization from at least one block creation submitter constraint 122, and a block approval authority 124.

Arbitration server 118 can be allowed to view the block creation submitter constraint 122 specified within the configuration block, so as to authorize the submitter of newly submitted blocks 114 to the blockchain 110. Block creator constraint 122 is configured to regulate and approve which block submitter can submit a block 114 to the blockchain 110. Block creator constraint 122 is assigned to each type of block defined in the block type definition section of a configuration block of blockchain 110.

The configuration block's block type definition section also defines a block approval authorization 124 (approval policy) that selectively allow. Blockchain approvers 106a-b approves the addition of the block 114 according to the block creator constraint 122 and the block approval policy 124. This double-approval creates a private environment in which a barrier forms between the arbitration server 118 and blockchain 110. In this manner, data is not leaked to unauthorized blockchain participants, such as unauthorized blockchain participants, who may be an administrator, a server 118, and a client. Each approver may optionally use its own private disapproval policy after applying the block approval policy 124.

Looking again at FIG. 1, security system 100 is also unique in that the arbitration server 118 is configured to sum the number of approvals for new blocks 114 added to the blockchain 110. In summing, if the accumulated approvals and disapprovals of blocks satisfy the block's approval policy, blockchain arbitration server adds a block 112 to the blockchain 110 and sends it to blockchain participants upon queries.

However, if the accumulated approvals and disapprovals of blocks don't satisfy the block's approval policy, arbitration server 118 drops the block 116. This selective addition of blocks to the blockchain is the core of the security taught by system, creating an if-then option that enhances security for blockchain 110.

Blockchain participants can also verify if the new blocks added by the arbitration server satisfy the block creator constraint and block approval constraints for each typed block. For example, suppose a particular typed block's approval policy is AtLeast(3, Approvers). And suppose 4 approvers send "approval" and 3 approvers send "disapproval" to the blockchain arbitration server. Since there are at least 3 approvals collected, the arbitration server concludes that this block is approved and broadcasts it to other blockchain participants upon request. And of course, all approvals & disapprovals, or at least 3 approvals, are included in the new block as a proof that this block was indeed approved by at least 3 approvers.

According to a desirable embodiment, even if clients 102, 104a-b, 106a-b, 108a-b frequently go online and offline, blockchain arbitration server 118 always maintains the blockchain service by remaining online at all times. Blockchain arbitration server 118 may be a server operated by a third party not directly interested in clients, and may be, for example, a cloud hosting provider. In this case, a device is needed that can provide clients 102, 104a-b, 106a-b, 108a-b with useful blockchain services from blockchain arbitration server 118 such as data storage and executable of smart contracts while preventing arbitration server 118 from damaging the integrity of blockchain 110. As a solution to this, security system 100 does not have arbitration server 118 participate as a participant of the blockchain; but only as an intermediate.

Thus, arbitration server 118 has no legitimate signature key such as those possessed by the participants of the blockchain 110, and therefore cannot damage the integrity of the blockchain 110. Meanwhile, the blockchain participants need to ensure confidentiality so that sensitive data in the blockchain cannot be leaked to the blockchain intermediation server 118. The present invention proposes a selective block encryption technique for this purpose. The purpose of the selective block encryption is to prevent data in the blockchain from being leaked out of the blockchain from both the blockchain intermediation server 118 and the nonparticipants 108a, 108b.

In some embodiments, the cryptographic key used for the blockchain encryption may be a cryptographic key that is shared only between administrators 102, blockchain approvers 106*a-b*, and viewers 104*a-b*. The blockchain encryption can be selectively applied to each section in each block, while the arbitration server 118 and the nonparticipants 140 cannot decrypt the encrypted contents. An embodiment of selective block encryption will be discussed in detail later.

Each block 112, 114, 120 of blockchain 110 has a hash value of a previously created block 120, i.e., a hash pointer, has a signature value of a block creator, and includes a signature value of blockchain approvers 106*a-b* required for approval of the block. The signature values can be used to verify the integrity of each block. According to one desirable embodiment, the blockchain 110 can be stored and managed in the arbitration server 118, and the arbitration server 118 cannot decrypt the encrypted portion of the blockchain 110.

In some embodiments, blockchain 110 is distributed and stored in the local device of an administrator 102, a blockchain approver 106*a-b*, and a viewer 104*a-b*. This distributed storage technique may be employed usefully as a tool to verify whether the arbitration server 118 does not distort a specific block value at a specific point of time. A desirable example of this verification method is to check the cryptographic integrity of the hash values and signature values of the blockchain approver 106*a-b* carried by each block 112, 114, 120 of the blockchain 110.

Figure 2:
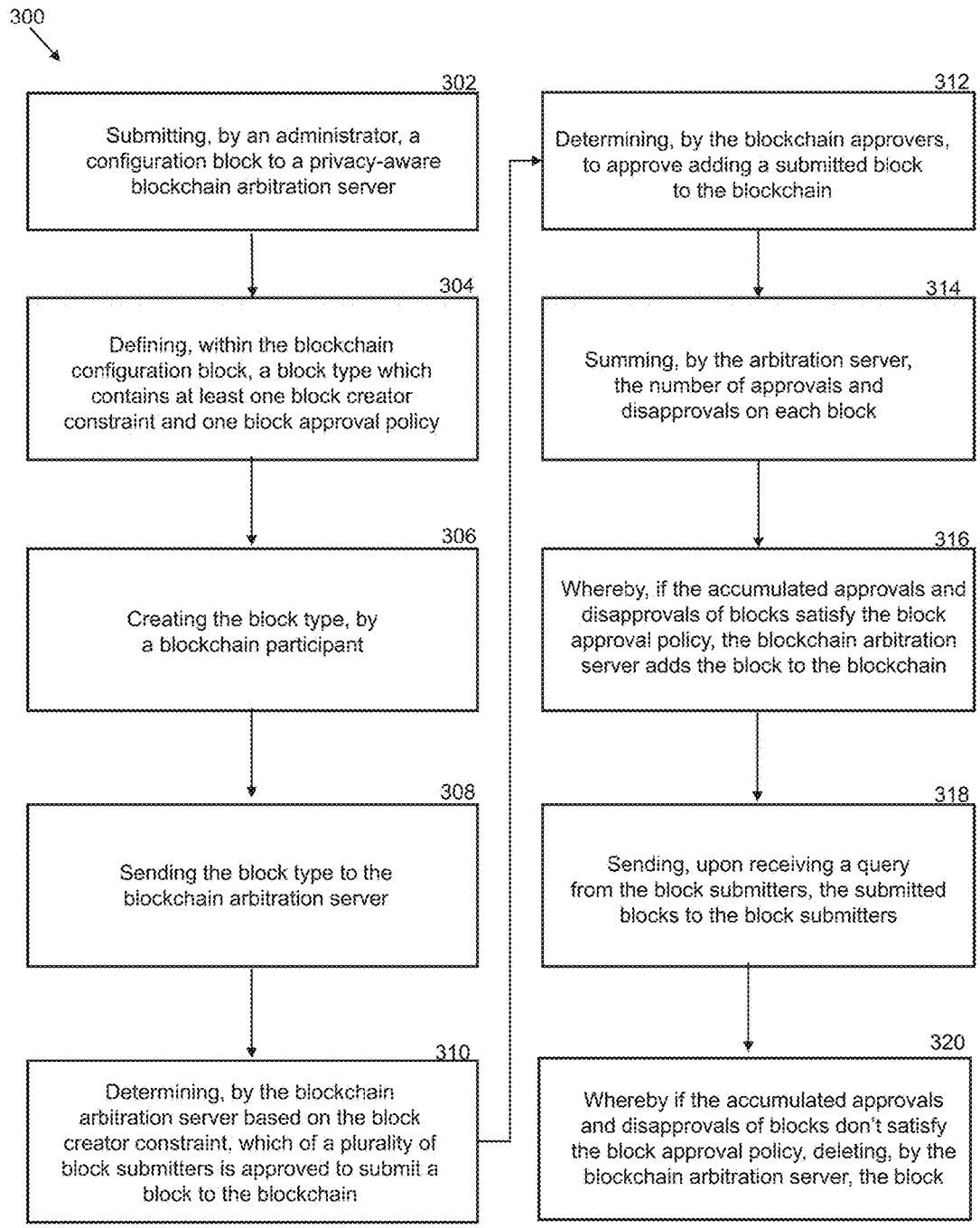
FIG. 2 illustrates a flowchart of an exemplary method for using a blockchain service through a privacy-aware blockchain arbitration server, in accordance with an embodiment of the present invention.

FIG. 2 illustrates a flowchart of an exemplary method 300 for using a blockchain service through a privacy-aware blockchain arbitration server. The following steps are included in the arbitration server for blockchain participants to use submit and read the blockchain. Method 300 may comprise an initial Step 302 of submitting, by an administrator, a configuration block to a privacy-aware blockchain arbitration server. The configuration block is the initial block for a new blockchain. This is somewhat equivalent to the genesis block for other blockchains such at Bitcoin or Ethereum.

The key to the security is that arbitration server 118, by default, has no right to view or modify the contents of the block. Thus, arbitration server 118 is not a participant of the blockchain 110; but only works as an intermediate. Thus, arbitration server 118 has no legitimate signature key such as those possessed by the participants of the blockchain 110, and therefore cannot damage the integrity of the blockchain 110, nor does it have the decryption key to decrypt the encrypted portion of the blockchain.

In some embodiments, method 300 may include a Step 304 of defining, within the blockchain configuration block, a typed block which contains at least one block creator constraint and one block approval policy. The block creator constraint is not created by blockchain approvers, but is specified in the typed block definition section in the blockchain configuration block submitted by the administrator. And the block creator constraint can be modified by modifying the already defined typed block definition, which can be done by submitting a reconfiguration block to the blockchain.

The method 300 may also include an additional step of creating, by the blockchain participant who satisfy a "Typed block Definition Modification: Creator Constraint", at least one typed block definition, the typed block definition regulating the block creator constraint and block approval constraint.

Figure 4:
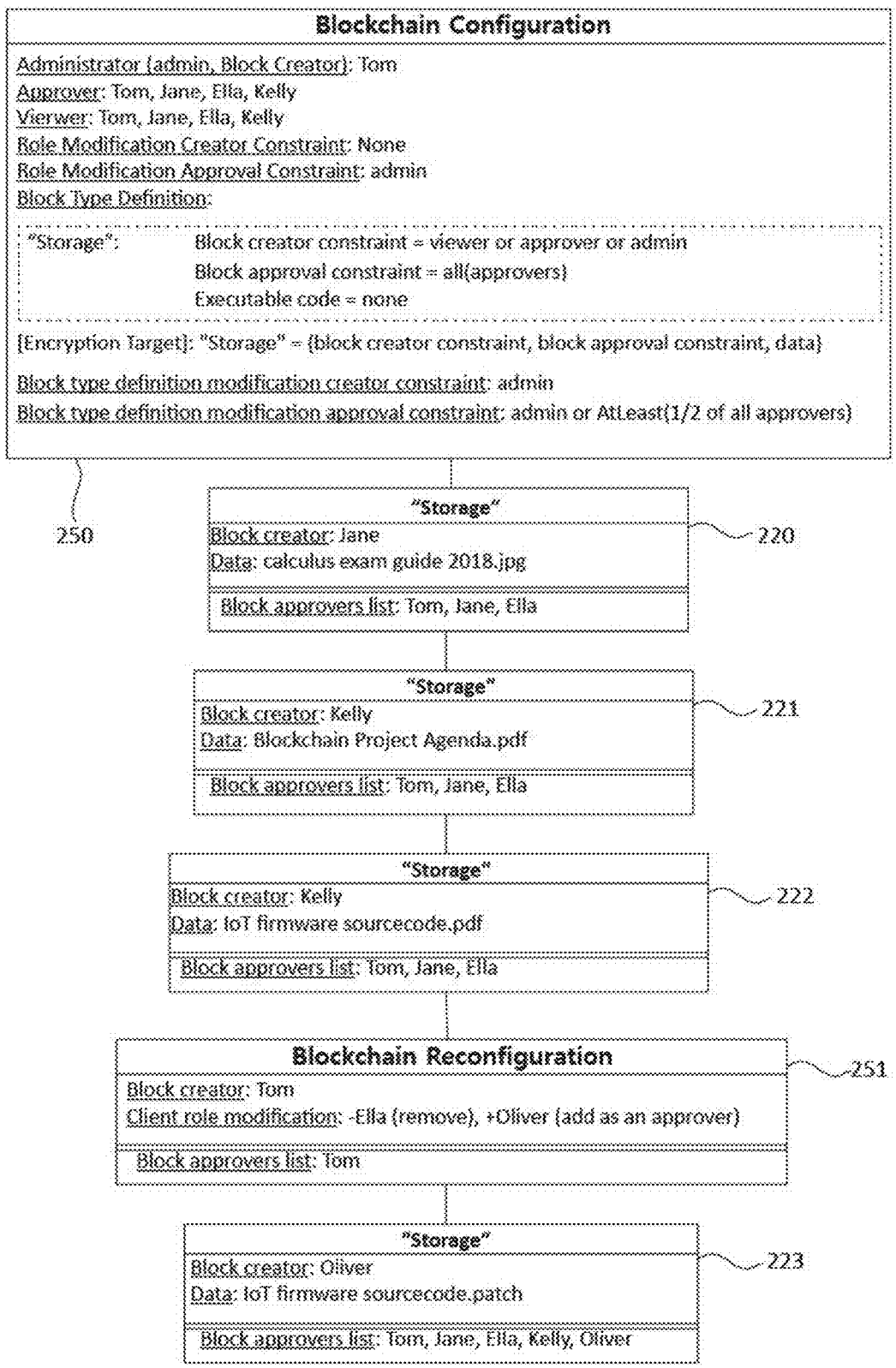
FIG. 4 illustrates a static file sharing embodiment based on the blockchain service, in accordance with an embodiment of the present invention.

As referenced in FIG. 4, the constraint regulating who may propose newly creating or modifying a typed block definition is specified in "Typed block Definition Modification: Creator Constraint". The constraint regulating the approval policy for a proposal that newly creates or modifies a typed block definition is specified in "Typed block Definition Modification: Approval Constraint".

For example, if the "Typed block Definition Modification: Creator Constraint" is "Bob", this means only Bob is allowed to propose creating or modifying a typed block definition. Also, if the "Typed block Definition Modification: Approval Constraint" is "AtLeast(3, Approvers)", this means a new or modified typed block proposed by Bob should be approved by at least 3 approvers in order for this typed block to be accepted within the blockchain.

A Step 306 may include creating the typed block, by a blockchain participant. Another Step 308 comprises sending the typed block to the blockchain arbitration server. For example, if some parts of the block contents are not encrypted, the arbitration server can read the contents. The information the blockchain arbitration server can access within a block can be used by the server to more efficiently process blocks. So there's a tradeoff between hiding information against the server and making the blockchain processing more efficient.

A Step 310 includes determining, by the blockchain arbitration server based on the block creator constraint, which of a plurality of block submitters is approved to submit a block to the blockchain. In reality, before the determining step, there is a step that the server sends the typed block to the approvers of the blockchain. Also, the approvers send their approval or disapproval to the arbitration server.

In some embodiments, the block approval policy comprises a Boolean expression. For example, a block creation submitter constraint 122 can be "Bob or Alice", or "any viewer or any approving authority". An example of a block creation submitter constraint 122 can be "At Least(3, All (approving authority))", which means at least 3 of all approving authority should sign it. FIGS. 4 and 5 reference additional examples of block creator constraint 122.

In some embodiments, a Step 312 comprises determining, by the blockchain approvers, a block approval on the block received by in the arbitration server, based on the target block type's block approval policy and each approver's optional private disapproval policy. A Step 314 includes summing, by the arbitration server, the number of approvals and disapprovals on each block. In some embodiments, a Step 316 may include whereby, if the accumulated approvals and disapprovals of blocks satisfy the block approval policy, the blockchain arbitration server adds the block to the blockchain.

A Step 318 comprises sending, upon receiving a query from the blockchain participants, the queried blocks to the block submitters. The method may further comprise a Step 318 of whereby if the accumulated approvals and disapprovals of blocks don't satisfy the block approval policy, deleting, by the blockchain arbitration server, the block.

A final Step 320 includes verifying, by the blockchain participants upon receiving blocks from the blockchain arbitration server, whether received blocks satisfy each of their block creator constraint and block approval policy. In this manner, both the creator constraint 122 and the block approval policy 124 authorize addition of block 114 to blockchain 110. This is because any blockchain participants who have a read privilege, who are typically an administrator, approvers and viewers, can verify the legitimacy of each block.

All block submitters & participants can cryptographically verify if the block added by the blockchain arbitration server satisfies the block approval policy & block creator constraint. This aspect is also important, because even if the arbitration server is dishonest/compromised and adds an invalid block, other blockchain participants can spot it. In other words, our blockchain security is not centralized to the arbitration server, but decentralized across all blockchain participants.

Another Step may include creating, by a blockchain participant, a reconfiguration block which contains at least one role change proposal, a role change proposal suggesting as to change the role of a particular participant/non-participant to a administrator, blockchain approver, or nonparticipant. The role change proposal is authorized by the blockchain arbitration server and approvers based on the role change creator constraint and role change approval policy (constraint) specified in the configuration block, which is processed in the similar way as authorizing addition of a new block.

Yet another Step comprises creating, by a blockchain participant, a reconfiguration block which contains at least one block type definition, a block type definition defining a typed block's block creator constraint, block approval constraint, and executable code.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

Figure 3:
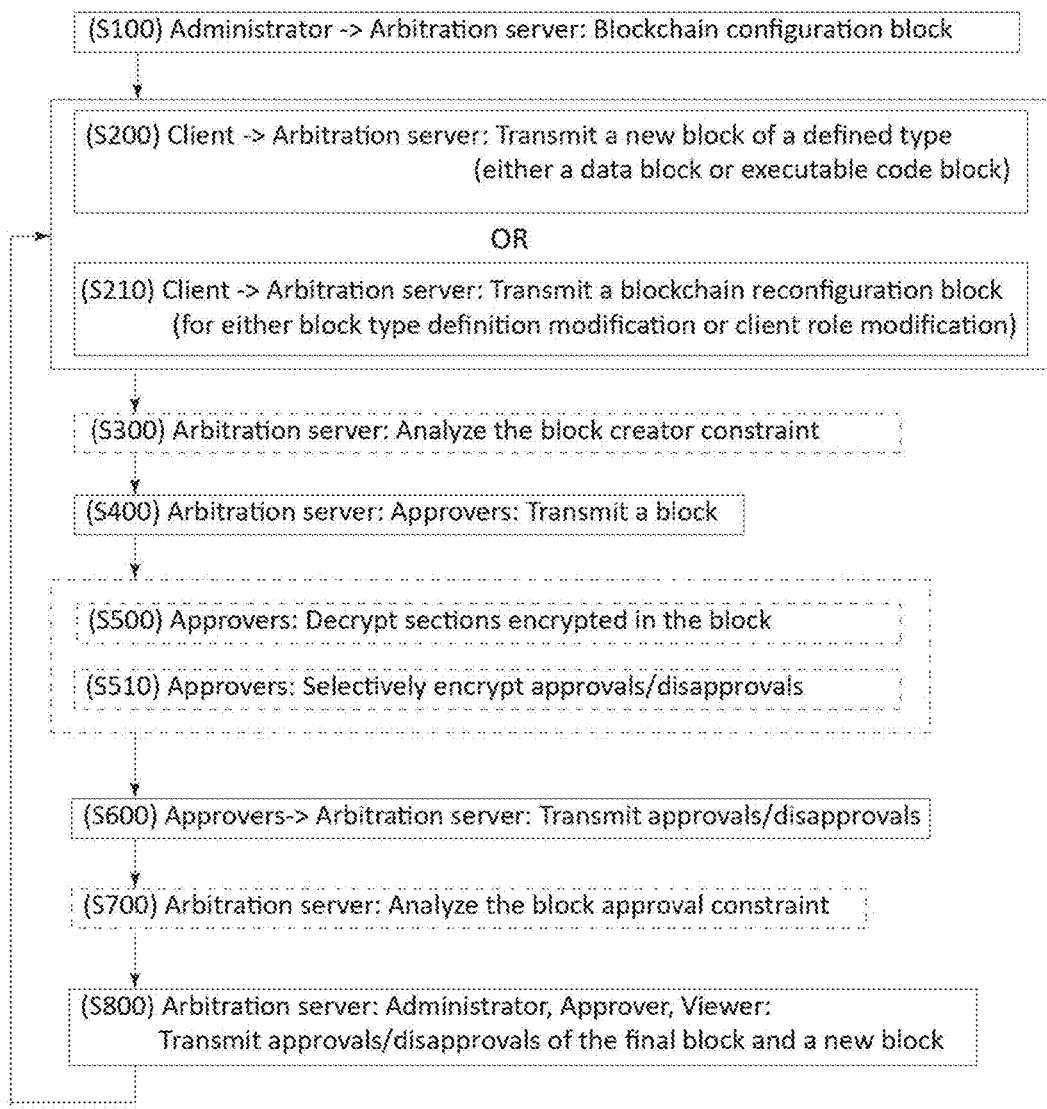
FIG. 3 illustrates a flowchart of an arbitration server based the blockchain service, in accordance with an embodiment of the present invention.

FIG. 3 shows a flowchart of an arbitration server based the blockchain service according to one possible embodiment of the present invention. A specific client opens the first block of the blockchain through the arbitration server 118 as an administrator 102 and then clients 102, 104a-b, 106a-b, 108a-b continuously transmit the blocks to be added to the blockchain to the arbitration server, thereby creating the blockchain 110. The way of the clients communicating with arbitration server 118 is to use, for example, an SDK or API of a web browser or an independently created communication application.

In an embodiment of the present invention, a block that a client can transmit to arbitration server 118 while using the blockchain service on the bases of the arbitration server is largely one of two blocks: one is a blockchain configuration/reconfiguration block and the other is a specific type of block object defined within the blockchain configuration/reconfiguration block. The blockchain configuration/reconfiguration block defines and stores basic configuration values for the blockchain 110. To facilitate understanding of the two blocks, FIG. 4 will now be described.

FIG. 4 shows a static file sharing embodiment based on the blockchain service proposed by the present invention. In the above embodiment, four clients (Tom, Jane, Ella, Kelly) use a blockchain for sharing and updating files such as term study books, project reports, and development program source codes. As described above, the blocks constituting the blockchain of FIG. 4 are mainly composed of a blockchain configuration/reconfiguration blocks 250, 251, and a specific type of block objects 220, 221, 222, 223 defined in the blockchain configuration/reconfiguration blocks 250, 251.

Blockchain configuration block 250 of FIG. 4 stores basic configuration values for the blockchain of FIG. 4; for example, a list of clients having roles of administrator, approver, and viewer for the blockchain of FIG. 4. The identification value of each client specified in the list may be an ID of a client or a unique public key of a client.

The role change creator constraint is a predicate that expresses the qualification of the creator of a block proposed to modify the role of a particular client in a blockchain; in configuration block 250 of the blockchain, there is no such constraint. That is, anyone can create a blockchain reconfiguration block 251 that requests to join the blockchain as a viewer or an approver.

The role change approval constraint is a predicate expressing a constraint for which approval predicate should be used to modify the role of a specific client to a blockchain. In the blockchain configuration block 250, this is specified as the administrator, Tom. In other words, the block 251 for requesting participation in the blockchain can be created and submitted by anyone, but this block is recognized only when it is approved by Tom. The mark of approval may be an electronic signature of an approver.

The typed block definition defines a type of blocks except blockchain configuration/reconfiguration blocks that clients can add in a blockchain. The blockchain configuration block 250 of FIG. 4 defines a block of the type, "storage." The constraint for a block creator that creates the "storage" block is that the creator must be a viewer, an approver, or an administrator. The constraint under which the "storage" block is approved is that it should be granted by all approvers within the blockchain. The "storage" block does not work with executable codes; that is, the "storage" block is used for storing simple static data.

The encryption target specifies which sections are to be encrypted for each of the above-defined typed blocks. It is specified in the blockchain configuration block 250. This section describes whether to encrypt each of a block creator constraint, a block approval constraint, and data of the block type definition section. Although not shown in FIG. 4, the cryptographic key may be a public cryptographic key that is managed by an administrator and distributed/re-distributed to the approvers and viewers of the blockchain.

Typed block definition modification creator constraint is a predicate indicating the qualification of a block creator that creates a blockchain reconfiguration block that proposes to create/modify the definition of a typed block. In the case of the configuration block 250 of the blockchain, this constraint is an admistrator, Tom.

The approval constraint of the typed block definition modification is a predicate indicating an approval constraint for a blockchain reconfiguration block that suggests modification of the typed block definition. In the case of the configuration block 250 of the blockchain, the constraint is to obtain approval from majority of the approvers participating in the blockchain.

The "storage" blocks 220, 221, 222, and 223 of FIG. 4 contain information of a block creator, block data, and block approver list. The first three blocks 220, 221, 222 store jpg, pdf and cpp extension files respectively, and the last block 223 stores modification/update information for cpp extension files stored in the third block 222 as .patch file extension. The blockchain clients can proceed in this manner by agreeing together for time-sequential updates and renewals for specific files.

Blockchain reconfiguration block 251 of FIG. 4 also contains information of a block creator, block data, and block approver list. The blockchain reconfiguration block 251 is created and approved by the administrator Tom and the content of the block 251 is to modify the roles of the clients, specifically demoting Ella to the role of non-participant and newly admitting Oliver as an approver.

When a new block in the blockchain of FIG. 4 is approved and recognized is only when a new block satisfies both the block creator constraint and the block approval constraint.

FIG. 5 shows a dynamic executable code embodiment based on the blockchain service proposed by the present invention. In this embodiment, the IoT A, B, and C transmit the sensor data measured by themselves to the data market server, for which the data market server periodically pays each IoT as a reward. The blockchain of FIG. 5 records the data transfer sales and the payment process, and four viewers (Tom, Jane, Ella, Kelly) can browse the blockchain.

The difference between the blockchain of FIG. 5 and the blockchain of FIG. 4 is that some types of blocks ("data sales", "payment") defined in the blockchain configuration block are defined to be interlocked with the dynamic executable code. Three types of blocks are defined in the blockchain configuration block 252 of FIG. 5: "contract document", "data sales", and "payment," all of which are allowed to be created by anyone. Each block has its own approval constraint and executable code section.

"Contract document" block is defined as a generic static data storage block that is not interlocked with executable codes, and the block must be approved by all approvers within the blockchain in FIG. 5 to be approved.

The "data sales" block is defined to be interlocked with a specific executable code written in a computer language, such has C or Java, for example. The first argument of the executable code is a seller (seller identification code), and the second argument is defined as data (sold data). That is, the role of the executable code can be presumed to record the identifier of the IoT that sold the data, and to record the sold data value. In order for the "data sales" block to be approved, both the data market server and the seller (seller), the first input value (argument value) of the executable code, must be approved.

The "payment" block is defined to be interlocked with a specific executable code written in Java language. The first argument of the executable code is beneficiary (beneficiary identification code), and the second argument is defined as payment (benefit amount). That is, it can be assumed that the role of the executable code is to record the identifier of the beneficiary to be paid and the benefit amount. In order for the "payment" block to be approved, it must be approved by both the data market server and the beneficiary, the first input value (argument value) of the executable code.

Finally, the encryption target section of the blockchain configuration block 252 specifies to encrypt the data and approver's approval (e.g., electronic signature value) for the "contract document" block, to encrypt the sales data which is the argument value (input value.argument2), and to encrypt the executable code linked with the "payment block" and the benefit amount payment, the second argument (argument value.argument2). The encryption target shall be set as data, executable code, or input value considered to contain sensitive information in each type of block, and the subsequent modification to the encryption target may be performed by creating a blockchain reconfiguration block 253 modifying the typed block definition.

According to the configuration block 252 of the blockchain shown in Drawing4, the constraint of the block creator for creating the reconfiguration block 253 modifying the typed block definition is that an administrator should be in charge of the job. For the block definition modification to be approved, it must be approved by more than half of all the approvers in the blockchain.

The blockchain of FIG. 5 comprises one initial blockchain configuration block 252 and one blockchain reconfiguration block 253, one data block 223, "contract document", and three executable code blocks 224, 225, 226, "data sales", "payment". In the "contract document" block, contract documents for the use of the data market are stored as static data with a pdf extension. In the "data sales" block 224, 225, identification values of the IoT A or B and data values transmitted from the IoT to the data market server are stored. These two values are used as arguments (input values) of C executable code defined to be linked with the "data sales" block.

In the "payment" block 226, the identification value of the IoT C and the benefit amount paid from the data market server are stored. These two values are stored as the arguments of the Java executable code defined to be linked with the "payment" block. The blockchain reconfiguration 253 block contains the contents of modifying the typed block definition: specifically, the approval constraint of the "contract document" block is modified to get approvals from all approvers in the blockchain, the data market server, and Oliver.

FIG. 3 shows a flowchart of the blockchain service based on the arbitration server in accordance with a desirable embodiment of the present invention. First, a specific client transmits a blockchain configuration block to the arbitration server 118 as the first block (a genesis block).

When the transfer is successful, a new blockchain 110 is established, and the role of the client 102, 104a-b, 106a-b, 108a-b becomes the administrator 102 of the blockchain from this point in time. Thereafter, the blockchain clients 102, 104a-b, 106a-b, 108a-b may transmit new blocks to the arbitration server, which may be a reconfiguration block S210 for the blockchain 118, or they can be a specific kind of block object defined in the configuration block S200.

The block object of a specific type defined in the blockchain configuration block can be divided into two types: namely, a data block defined not to be interlocked with the execution code, and an execution code block defined to be interlocked with the execution code. Also, the blockchain reconfiguration block may include one of two modification sections: one is modification of a typed block definition, and the other is modification of a client role.

When arbitration server 118 receives the block from the client, it attempts block creator authentication for the block S300. However, if the configuration/reconfiguration block of the blockchain specifies to encrypt the block creator authentication constraint for the block, the arbitration server 118 skips this step because it cannot perform the block creator authentication.

If arbitration server 118 prospects that the block creator authentication of the block can be successful or failure, the arbitration server 118 selectively transmits the block to the approvers 106a-b having the approval authority for the block S400. If the approval constraint of the block is encrypted, the arbitration server 118 cannot selectively determine the approvers 106a-b having the approval authority for the block, so the block is transmitted to all approvers in the blockchain 110 for this case.

If the arbitration server 118 fails to transmit the block because the specific approvers 106a-b are off-line, subsequent reconfiguration trials are made until transmitting the block becomes successful for the approvers who failed to transmit the block, after the block is transmitted to the rest of the approvers except for the corresponding approvers. Each approver 106a-b receiving the block decrypts sections if they are encrypted in the block S500, determines whether to approve the block, and encrypts approvals/disapprovals of the block when the approvals/disapprovals should be encrypted S510.

An approver 106a-b transmits the approval status to the arbitration server S600. Arbitration server 118 waits until it receives approvals from the approvers 106a-b of the number necessary for confirming the approval constraint of the block. If the approval constraint verification result for the block is finally determined S700, the arbitration server 118 delivers the approval result of the block and the block newly created by the approvals to the clients S800. On the other hand, if the approval constraints for the block or the approver's approvals are encrypted, the arbitration server 118 cannot perform the block approval constraint verification on its own, so the block approval verification step S700 is skipped.

Instead, the arbitration server creates a new block integrating approvals/disapprovals delivered (encrypted) by approvers 106a-b, adds the new block to the blockchain, and transmit the new block to the clients. In the latter case, whether to verify approval constraints for the new block and whether it is legitimate should be directly judged by the participants of the blockchain.

There is a restriction in a blockchain that only one block can be added at a time. Therefore, if a plurality of clients 102, 104a-b, 106a-b, 108a-b simultaneously transmit new blocks to the arbitration server S200, S210, the arbitration server must select one of these client blocks; in this case, the clients 102, 104a-b, 106a-b, 108a-b need to verify the fairness of the arbitration server.

One of the desirable embodiments for this is to use a time-slicing technique to allow new block transmissions only for a predetermined period of time that is pre-assigned to each client. If a block that a particular client has sent to the arbitration server S200, S210 within a given period of time has been rejected from the arbitration server S200, S210 or the blocks thus transmitted frequently fail to be transferred. This can be an evidence to challenge the unfairness of the arbitration server S200, S210.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A computer-implemented security method for using a blockchain service through a privacy-aware blockchain arbitration server, the method comprising:
   submitting, by an administrator, a configuration block to a privacy-aware blockchain arbitration server;
   defining, within the blockchain configuration block, a typed block which contains at least one block creator constraint and one block approval policy;
   creating a typed block, by a blockchain participant;
   sending the typed block to the blockchain arbitration server;
   determining, by the blockchain arbitration server based on the block creator constraint, which of a plurality of block submitters is approved to submit a block to the blockchain;
   determining, by the approvers, to approve adding a submitted block to the blockchain;
   summing, by the arbitration server, the number of approvals and disapprovals on each block;
   whereby, if the accumulated approvals and disapprovals of blocks satisfy the block approval policy, adding, by the blockchain arbitration server, the block to the blockchain;
   sending, upon receiving a query from the blockchain participants, the queried blocks to the querying participants;
   whereby if the accumulated approvals and disapprovals of blocks don't satisfy the block approval policy, deleting, by the blockchain arbitration server, the block.

2. The method of claim 1, further comprising a step of verifying, by blockchain participants upon receiving blocks from the blockchain arbitration server, whether received blocks satisfy each of the block creator constraint and block approval policy.

3. The method of claim 1, wherein the blockchain participant includes at least one of the following: the administrator, a block viewer, a blockchain approver, and a nonparticipant.

4. The method of claim 3, further comprising a step of creating, by the blockchain participant, at least one role change creation, a role change creation regulating the roles of the administrator, the blockchain approver, the block creator, the block viewer, and the nonparticipant.

5. The method of claim 4, further comprising a step of creating, by the blockchain participant who satisfy at least one typed block definition, the typed block definition regulating the block creator constraint and block approval constraint.

6. The method of claim 5, wherein the block creator has a read privilege on the blockchain.

7. The method of claim 6, wherein the nonparticipant is restricted from the read privilege.

8. The method of claim 7, wherein the arbitration server, by default, has a restricted capability to view or modify the contents of the block.

9. The method of claim 1, wherein the block creator constraint and block approval policy comprise a Boolean expression.

10. The method of claim 1, wherein both the block creator constraint and the block approval policy authorize addition of the block to the blockchain.

11. A computer-implemented security method for using a blockchain service through a privacy-aware blockchain arbitration server, the method comprising:
   submitting, by an administrator, a configuration block to a privacy-aware blockchain arbitration server;
   defining, within the blockchain configuration block, a typed block which contains at least one block creator constraint and one block approval policy;
   creating a typed block, by a blockchain participant;
   sending the typed block to the blockchain arbitration server;
   determining, by the blockchain arbitration server based on the block creator constraint, which of a plurality of block submitters is approved to submit a block to the blockchain;
   determining, by the approvers, to approve adding a submitted block to the blockchain;
   summing, by the arbitration server, the number of approvals and disapprovals on each block;

whereby, if the accumulated approvals and disapprovals of blocks satisfy the block approval policy, adding, by the blockchain arbitration server, the block to the blockchain;

sending, upon receiving a query from the blockchain participants, the queried blocks to the querying participants;

whereby if the accumulated approvals and disapprovals of blocks don't satisfy the block approval policy, deleting, by the blockchain arbitration server, the block; and verifying, by the blockchain participants upon receiving blocks from the blockchain arbitration server, whether received blocks satisfy each of the block creator constraint and block approval policy.

12. The method of claim 11, wherein the block creator has a read privilege on the blockchain.

13. The method of claim 12, wherein the nonparticipant is restricted from the read privilege.

14. The method of claim 13, wherein the arbitration server, by default, has a restricted capability to view or modify the contents of the block.

15. The method of claim 14, wherein the block creator constraint and the block approval policy comprise a Boolean expression.

16. The method of claim 15, wherein the block creation submitter constraint and the block approval policy authorize addition of the block to the blockchain.

17. The method of claim 16, further comprising a step of creating, by the blockchain participant who satisfy at least one typed block definition, the typed block definition regulating the block creator constraint and block approval constraint.

18. The method of claim 11, wherein the blockchain participant includes: the administrator, a block viewer, a blockchain approver, and a nonparticipant.

19. The method of claim 18, further comprising a step of creating, by the blockchain participant, at least one role change creation, a role change creation regulating the roles of the administrator, the blockchain approver, the block viewer, and the nonparticipant.

20. A computer-implemented security method for using a blockchain service through a privacy-aware blockchain arbitration server, the method consisting of:

submitting, by an administrator, a configuration block to a privacy-aware blockchain arbitration server;

defining, within the blockchain configuration block, a typed block which contains at least one block creator constraint and one block approval policy;

creating a typed block, by a blockchain participant, the blockchain participant including at least one of the following: the administrator, a block viewer, a blockchain approver, and a nonparticipant;

sending the typed block to the blockchain arbitration server;

determining, by the blockchain arbitration server based on the block creator constraint, which of a plurality of block submitters is approved to submit a block to the blockchain;

determining, by the approvers, to approve adding a submitted block to the blockchain;

summing, by the arbitration server, the number of approvals and disapprovals on each block;

whereby, if the accumulated approvals and disapprovals of blocks satisfy the block approval policy, adding, by the blockchain arbitration server, the block to the blockchain;

sending, upon receiving a query from the blockchain participants, the queried blocks to the querying participants;

whereby if the accumulated approvals and disapprovals of blocks don't satisfy the block approval policy, deleting, by the blockchain arbitration server, the block;

verifying, by the blockchain participants upon receiving blocks from the blockchain arbitration server, whether received blocks satisfy each of the block creator constraint and block approval policy; and creating, by the blockchain participant, at least one role change creation, a role change creation regulating the roles of the administrator, the blockchain approver, the block viewer, and the nonparticipant.

* * * * *